United States Patent Office 3,338,881
Patented Aug. 29, 1967

3,338,881
SPARSOMYCIN A DIHYDROGEN PHOSPHATE
Paul F. Wiley, Texas Township, Kalamazoo County, Mich., assignor to The Upjohn Company, Kalamazoo, Mich., a corporation of Delaware
No Drawing. Continuation of application Ser. No. 343,474, Feb. 10, 1964. This application Apr. 2, 1965, Ser. No. 445,267
3 Claims. (Cl. 260—211.5)

This invention relates to a novel antibiotically and cytotoxically active product and is more particularly concerned with 4 - amino - 7 - D-ribofuranosyl-7H-pyrrolo [2,3-d]-pyrimidine 5′ - dihydrogenphosphate, the intermediates in its production and the process of production thereof.

This application is a continuation of application Ser. No. 343,474, filed Feb. 10, 1964 and now abandoned.

The novel product 4-amino-7-D-ribofuranosyl - 7H-pyrrolo[2,3-d]-pyrimidine 5′-dihydrogenphosphate, hereafter also referred to as sparsomycin A dihydrogenphosphate, and intermediates therefor, can be illustratively prepared by the following process:

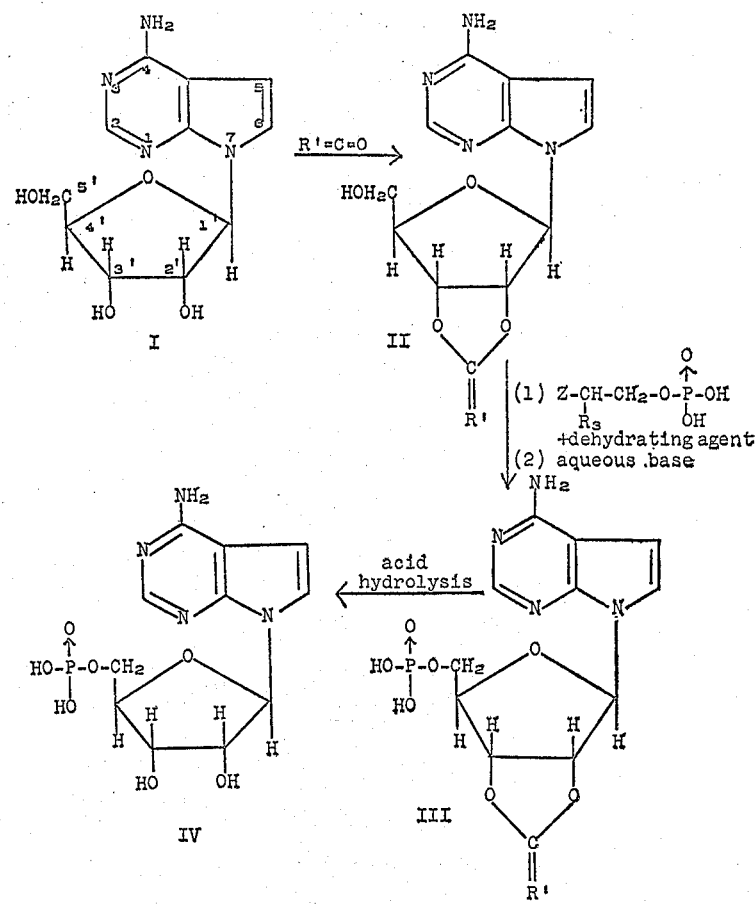

wherein R′ is selected from the group consisting of alkylene of formula —$(CH_2)_n$— in which $n$ has a value of 4 to 6, inclusive, and $R_1$ and $R_2$ in which $R_1$ and $R_2$ are selected from the group consisting of lower alkyl and hydrogen, wherein $R_3$ is selected from the group consisting of lower alkyl and hydrogen and wherein Z is a strongly negative substituent.

Lower alkyl is intended to mean alkyl radicals having from 1 to 4 carbon atoms, such as methyl, ethyl, propyl, isopropyl, butyl, isobutyl and t-butyl.

The strongly negative substituent is generally the cyano group but can also be groups such as

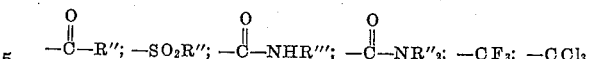

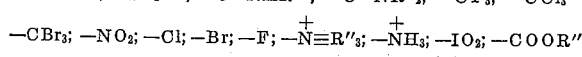

and other like groups, wherein R″ is selected from the group consisting of lower alkyl and aryl and wherein R‴ is selected from the group consisting of hydrogen, lower alkyl and aryl.

The process of the present invention comprises: reacting sparsomycin A with an aldehyde or ketone such as acetaldehyde, propionaldehyde, acetone, methyl ethyl ketone, diethyl ketone, dipropyl ketone, dibutyl ketone, or the like in the presence of an acid catalyst such as p-toluenesulfonic acid, to obtain a sparsomycin A acetal (II); reacting compound II with a phosphate ester, for example, ethyl dihydrogenphosphate wherein ethyl is substituted in the β-position by an electro-negative group such as the cyano group, in the presence of a dehydrating reagent such as carbodiimides, especially dicyclohexylcarbodiimide, diisopropylcarbodiimide, or the like to obtain the corresponding β-substituted ethyl dihydrogenphosphate of sparsomycin A acetal; treating this product with an aqueous base, for example lithium hydroxide, sodium hydroxide, ammonium hydroxide or potassium hydroxide, to obtain the 5′-dihydrogenphosphate of sparsomycin A acetal (III); and treating III with an acid to remove the acetal moiety to obtain the 5′-dihydrogenphosphate of sparsomycin A (IV). Sparsomycin A dihydrogenphosphate is a weakly acidic compound which has properties adversely affecting the growth of certain organisms, particularly gram-positive and gram-negative bacteria, for example, *Staphylococcus aureus* and *Proteus vulgaris*.

Sparsomycin A dihydrogenphosphate, being active against *Proteus vulgaris*, can be used to prevent or minimize liquefaction of packed yeast caused by this organism. Sparsomycin A dihydrogenphosphate can also be used for washing excised tumor tissue intended for transplants in animals. This procedure will inhibit the growth of any KB tumor cells that might otherwise seed surrounding tissues or be transported to other parts of the animal body. Sparsomycin A dihydrogenphosphate is more readily available and useful to the cells of tissues than the unesterified sparsomycin A itself.

The starting material for the present invention is sparsomycin A, prepared as shown in Preparation 1.

In carrying out the process of the present invention sparsomycin A is converted with an aldehyde or ketone to the corresponding acetal in the presence of an acid catalyst. Aldehydes and ketones which can be used in this reaction are formaldehyde, acetaldehyde, propionaldehyde, butyraldehyde, isobutyraldehyde, acetone, methyl ethyl ketone, diethyl ketone, dipropyl ketone, diisopropyl ketone, dibutyl ketone, diisobutyl ketone, di-t-butyl ketone, cyclopentanone, cyclohexanone, cycloheptanone, and the like. Sparsomycin A can be admixed with or dissolved in the selected aldehyde or ketone, or additionally a solvent or dispersing agent for sparsomycin A and the selected ketone or aldehyde may be used. Inert solvents or dispersing agents such as chloroform, carbon tetrachloride, methylene chloride, ethylene chloride, tetrahydrofuran, dioxane or the like can be used for this purpose. The temperature of the reaction can be between 15° and the boiling temperature of the reaction mixture. Furthermore, to carry out the reaction advantageously an acid catalyst is used, such as benzenesulfonic acid, toluenesulfonic acid, chlorobenzenesulfonic acid and the like.

In the preferred embodiment of the invention sparsomycin A is admixed with or dissolved in the desired ketone or aldehyde, preferably acetone. p-Toluenesulfonic acid is added as catalyst, and the reaction mixture is stirred at about room temperature (between about 20° and 30° C.) for a period of between about 30 minutes and 6 hours. After the reaction is terminated, the excess p-toluenesulfonic acid is neutralized with sodium or potassium bicarbonate and the desired material, sparsomycin A acetal, separated by conventional means, such as by concentration of the reaction mixture and/or extraction with a water-immiscible solvent, for example, chloroform, methylene chloride, butanol, or the like. Recrystallization from solvents, including water, is used to purify the sparsomycin A acetal, thus obtained.

Phosphorylation of the sparsomycin A acetal is carried out by the method of G. M. Tener, J. Am Chem. Soc. 83, 159 (1959). Solvents used in this procedure are anhydrous, non-hydroxylic solvents in which the phosphorylating agent, a phosphate ester, is also soluble. Such solvents are pyridine, picoline, lutidine, or the like. Neutral solvents such as dimethyl sulfoxide, tetrahydrofuran, N,N-dimethylacetamide or dioxane can be used, providing that for each mole of phosphorylating agent one equivalent of base is added. Representative bases for this reaction include pyridine, lutidine or trialkylamines.

Phosphate esters, which are readily cleaved by a base, are employed, and particularly useful for this reaction are β-substituted ethyl dihydrogenphosphates of the formula:

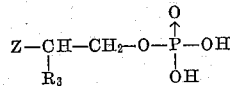

wherein $R_3$ is selected from the group consisting of hydrogen and lower alkyl, wherein Z is a strongly electro-negative substituent selected from the group consisting of

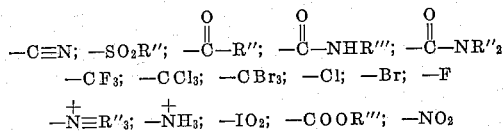

and the like, wherein R″ is selected from the group consisting of lower alkyl and aryl, and wherein R‴ is selected from the group consisting of hydrogen, lower alkyl and aryl. The preferred β-substituted-ethyl dihydrogenphosphate is β-cyanoethyl dihydrogenphosphate.

Instead of a β-substituted ethyl dihydrogenphosphate, other dihydrogenphosphate esters which are easily cleaved by a base may be used, for example o- and p-substituted-phenyl dihydrogenphosphates, such as o- and p-carboxyphenyl dihydrogenphosphate, o- and p-carbamoylphenyl dihydrogenphosphate, and o- and p-cyanophenyl dihydrogenphsophate.

In the solution containing the β-substituted ethyl dihydrogenphosphate or o- or p-substituted-phenyl dihydrogenphosphate, sparsomycin A acetal is dissolved. If necessary, in order to dissolve sparsomycin A acetal, the mixture may be heated to 30 to 50° C. After all sparsomycin A acetal has been dissolved, a dehydrating agent is added, such as an alkyl- or aryl-substituted carbodiimide; particularly preferred is dicyclohexylcarbodiimide. The carbodiimide has the purpose of removing water irreversibly from the β-substituted-ethyl dihydrogenphosphate to produce an intermediate tri-β-substituted-ethyl trimetaphosphate which is the actual active phosphorylating agent. Other compounds unrelated to carbodiimides which can be used as reagents are p-toluenesulfonyl chloride, ethoxyacetylene, ketene-imines, trichloroacetonitrile, substituted cyanamides, α-substituted acetonitriles, alkyl and aryl isocyanates, carboxylic acid chlorides, aralkyl chlorocarbonates, and the like.

The preferred temperatures for this reaction are those temperatures around and slightly above room temperature, that is, temperatures between 20 and 40° C.; however, the reaction can be carried out at lower temperatures, such as plus 5° C. and up to temperatures of about 75° C. without undue side reactions. At a temperature between 20 and 40° C. and at reasonable concentration, the time required for the reaction to be completed is about 6 to 24 hours. However, reaction times between 1 and 60 hours can be used; the reaction time should be significantly prolonged at greater dilutions.

The concentration of the reactants is not critical. Equimolecular amounts of sparsomycin A acetal, the β-substituted-ethyl dihydrogenphosphate and the base catalyst give approximately quantitative conversion, if sufficient time is allowed for the reaction to be completed. In order to shorten the time of reaction, a 3 to 4 times molar excess of the β-substituted-ethyl dihydrogenphosphate over sparsomycin A acetal is preferred. After the reaction is terminated, a small amount of water is added to inactivate the excess phosphorylating reagent and the excess of catalyst. The solution is then filtered to remove insoluble material such as the disubstituted ureas resulting from the reaction of carbodiimides with water, and the filtrate is used for the next step, the cleavage reaction.

The solution obtained from the prior step is reacted with an aqueous alkali hydroxide solution at elevated temperatures to produce the desired cleavage. In the preferred embodiment of the invention the solution containing the sparsomycin A acetal 5′-cyanoethyl dihydrogenphosphate is first concentrated until a small volume is obtained, concentration being usually achieved under vacuum. When the volume is low enough so that the cooled material becomes a viscous residue, a base, e.g., aqueous lithium, sodium or potassium hydroxide of a 0.4 to 2 normality, is added until the pH of the solution rises between 12 to 13. Concentrated ammonium hydroxide can also be used. This reaction mixture is allowed to react at room temperature or preferably at an elevated temperature, 50 to 80° C., for a period of 30 minutes to 24 hours, depending on the reaction temperature. After termination of the reaction, the mixture is cooled and filtered. From the filtrate the product, sparsomycin A acetal 5'-dihydrogenphosphate, is recovered by conventional methods such as extraction, evaporation, precipitation in the form of insoluble phosphate salts, absorption and desorption on resins and the like.

Thus-recovered sparsomycin A acetal 5'-dihydrogenphosphate is generally hydrolyzed without further purification to remove the acetal moiety, utilizing a mineral acid such as dilute sulfuric, dilute hydrochloric, hydrobromic, perchloric or a strong organic acid, e.g., trichloroacetic acid, and the like. After termination of the reaction, the desired product is recovered from the reaction mixture by conventional means such as extraction, precipitation and filtration, and the like. The thus-obtained sparsomycin A 5'-dihydrogenphosphate can be further purified by additional extraction, precipitation as insoluble salt, absorption and desorption on exchange resins and the like. Details of the isolation and purification of the thus-obtained sparsomycin A 5'-dihydrogenphosphate are shown in the subsequent examples.

PREPARATION 1.—SPARSOMYCIN A

A. *Fermentation*

A soil slant of *Streptomyces sparsogenes* var. *sparsogenes*, NRRL 2940, was used to inoculate a series of 500-ml. Erlenmeyer flasks each containing 100 ml. of seed medium consisting of the following ingredients:

| | |
|---|---|
| Glucose monohydrate | grams__ 25 |
| Pharmamedia [1] | do____ 25 |
| Tap water q.s. | liter__ 1 |

[1] Pharmamedia is an industrial grade of cottonseed flour produced by Traders Oil Mill Co., Fort Worth, Tex.

The seed medium presterilization pH was 7.2. The seed was grown for two days at 28° C. on a Gump rotary shaker operating at 250 r.p.m.

One shake flask of the seed described above (100 ml.) was used to inoculate a 20 liter seed tank containing 15 liters of the above sterile seed medium (S–1) plus 1 ml./l. of lard oil. The seed tank was grown for 24 hours at a temperature of 28° C., aeration rate of 10 standard liters/min., and agitated at a rate of 400 r.p.m.

The seed tank, described above, was then used to inoculate a 380-liter fermentor containing 250 liters of the following sterile medium:

| | |
|---|---|
| Glucose monohydrate | g./liter__ 10 |
| Dextrin | g./liter__ 15 |
| Pharmamedia | g./liter__ 20 |
| Wilson's Peptone Liquor No. 159 [1] | g./liter__ 5 |
| Lard oil | ml./liter__ 2 |
| Tap water | Balance |

[1] Wilson's Peptone Liquor No. 159 is a preparation of hydrolyzed proteins from animal origin.

The fermentation then proceeded for 113 hours during which time the temperature was controlled at 28° C., filtered air supplied at a rate of 100 standard liters/minute, and agitation at 28 r.p.m. During the course of the fermentation, 1850 ml. of lard oil was added as an antifoam.

B. *Recovery*

The whole beer from the above fermentation was adjusted from the harvested pH of 7.1 to pH 2.4 with 350 ml. of sulfuric acid (concentrated) and filtered using 3.6% diatomaceous earth as filter aid. The filter cake was washed with 0.2 volume of deionized water, the clear beer plus wash (vol. 280 liters) was adjusted to pH 7.35 with 300 ml. of 50% aqueous sodium hydroxide and allowed to stand overnight at 10° C. The clear beer was then adjusted to pH 8 with 50 ml. of 50% aqueous sodium hydroxide and stirred one hour with 1% decolorizing carbon and 3% diatomite. The mixture was filtered and the carbon cake washed with 0.2 volume of 20% aqueous acetone. The washed carbon cake was eluted twice with 0.4 volume of 50% aqueous acetone, acidified to pH 2.5 with concentrated sulfuric acid, and the eluates pooled. The pooled acetone eluate (72 liters) was adjusted to pH 6.4 with 30 ml. of 50% aqueous sodium hydroxide and concentrated to an aqueous solution (40 liters). The concentrate was adjusted to pH 5.9 and freeze dried to give 447 g. of lyophilized material.

An additional 1126 g. was obtained by twice repeating the above fermentation and recovery. The combined lyophilized material (1573 g.) was slurried in 10 liters of methanol at 40° C. for one hour. Insoluble material was filtered off and washed three times with 500 ml. of warm methanol (40° C.). The methanol extracts and washes were combined (11.5 liters) and concentrated in vacuo to a dry preparation weighing 321 g. (HRV–25.3) and assaying 1.25 *Proteus vulgaris* biounits/mg.

C. *Purification*

PARTITION COLUMN

Three hundred grams of the above preparation (HRV–25.3) was placed in a partition column which was prepared and developed in the following manner. A solvent system was made using equal volumes (350 liters) of McIlvaine's pH 6.0 buffer and methyl ethyl ketone. A slurry containing 9.6 kg. of diatomite in 60 liters of upper phase and 4.8 liters of lower phase of the above-described solvent system was poured into a 12″ column and packed with 4 p.s.i.g. of nitrogen. The column feed was dissolved in 3 liters of lower phase, slurried with 1920 g. of diatomite and enough upper phase added to make it mobile. The feed was carefully added to the top of the column bed which was covered with a layer of sea sand. The column was eluted with upper phase solvent at a rate of 2 l./minute. Four-liter fractions were collected except at the beginning and end of the column when 20-liter fractions were collected. The fractions were concentrated and bio-activities observed on *P. vulgaris* trays. At this point in the process the separation of sparsomycin and sparsomycin A was effectuated. Further processing purified these components and ultimately resulted in crystalline material.

Fractions 24–34, inclusive, from the above partition column contained the sparsomycin component.

PURIFICATION OF SPARSOMYCIN A

The sparsomycin A component was purified and crystallized in the following manner. Fractions 11–20, inclusive, from the previously described partition column—part C—contained the sparsomycin A component. These fractions were pooled and concentrated under reduced pressure and 7.2 grams of crystalline material was isolated. These crystals were dissolved in 400 ml. of water and 50 ml. of 0.1 N HCl. The solution was heated gently to facilitate dissolving and then filtered. The clear solution was adjusted to pH 9.0 with 50% aqueous sodium hydroxide and chilled in the refrigerator for 5 hours. The crystals were collected by filtration, washed with water, and dried to give 5.65 grams of preparation ADA–102.1. Two grams of this preparation were then dissolved in 75 ml. of water and 20 ml. of 0.1 N HCl. This clear solution was adjusted to pH 9.0 with 50% aqueous sodium hydroxide. Crystallization started immediately. The solution was left at 25° C. for 7 hours and then the crystals were collected, washed with 25 ml. of water, and dried to yield 1.52 grams of preparation ADA–105.1 having a melting point of 247.8–250° C., an optical rotation $[\alpha]_D^{25}$ −62° (c.=0.718 in 0.1

N HCl), an equivalent weight of 269, pKa′ of 5.07 in water, an ultra-violet absorption spectrum in

| | | |
|---|---|---|
| Water | 270 mµ, | a=44.14. |
| 0.01 N H₂SO₄ | 227 mµ, | a=85.28. |
| | 271 mµ, | a=40.82. |
| 0.01 N KOH | 270 mµ, | a=43.50. | a characteristic IR absorption at the following frequencies expressed in reciprocal centimeters

| | |
|---|---|
| 3350 (S) | 1198 (W) |
| 3250 (S) | 1160 (W) |
| 3145 (S) | 1134 (M) |
| 3095 (S) (sh) | 1120 (M) |
| 2880 (S) (oil) | 1093 (M) |
| 2810 (S) (oil) | 1080 (W) |
| 1895 (W) | 1055 (M) |
| 1640 (S) | 1042 (S) |
| 1592 (S) | 1017 (S) |
| 1553 (M) | 992 (S) |
| 1502 (M) | 953 (W) |
| 1475 (M) | 912 (W) |
| 1458 (S) (oil) | 903 (M) |
| 1445 (M) (sh) | 867 (M) |
| 1426 (M) | 852 (W) |
| 1370 (M) (oil) | 842 (W) |
| 1351 (M) | 799 (W) |
| 1306 (M) | 715 (W) |
| 1276 (W) | 704 (S) |
| 1255 (S) | 675 (M) |
| 1241 (M) | 658 (M) | and the following elemental analysis:

*Analysis.*—Calcd. for $C_{11}H_{14}N_4O_4$: C, 49.62; H, 5.30; N, 21.04. Found: C, 49.81; H, 5.20; N, 20.92.

Sparsomycin A was also isolated and purified from fermentation broth in another manner. The fermentation was carried on as described above under A. The whole beer (AJW–63) was adjusted to pH 2.5 with 365 ml. of concentrated sulfuric acid and filtered using 6% diatomaceous earth as filter aid. The filter cake was washed with 0.1 volume of deionized water and the wash added to the clear beer. The clear beer was then adjusted to pH 8.0 with 400 ml. of 50% aqueous sodium hydroxide and stirred one hour with 1% decolorizing carbon and 3% diatomite. The mixture was filtered and the carbon cake washed with 0.1 volume of deionized water following by 0.2 volume of 20% aqueous acetone. The washed carbon was eluted twice with 0.4 volume of 40% aqueous acetone which had been acidified to pH 2.5 with concentrated sulfuric acid, and the eluates were pooled. The pooled acetone eluates were then adjusted to pH 4.8 with 53 ml. of 50% aqueous sodium hydroxide, concentrated to an aqueous solution and freeze-dried to yield 284 grams of preparation WMH–32.6 assaying 9KB µ/mg. in tissue culture. One hunderd grams of this preparation was then dissolved in 600 ml. of methanol and 4 volumes of ether added to precipitate the inactive material. From the methanol-ether supernatant two crops of crystalline material were isolated by allowing the solvent to evaporate slowly. These preparations were pooled and redissolved in 35 ml. of water and 5 ml. of 0.1 N hydrochloric acid. The solution was then filtered and adjusted to pH 9.4 with 50% aqueous sodium hydroxide. The sparsomycin A which separated in crystalline form was collected, washed with water, and dried to give 480 mg. of preparation ADA–104.1 having a melting point of 247.8–250.8° C., an optical rotation $[\alpha]_D^{25}$ −61° (c.=0.908 in 0.1 N HCl), an equivalent weight of 270, pKa′ of 5.05 in water, an ultra-violet absorption spectrum in

| | | |
|---|---|---|
| Water | 269.5 mµ, | a=44.27. |
| 0.01 N H₂SO₄ | 227 mµ, | a=86.06. |
| | 271 mµ, | a=41.35. |
| 0.01 N KOH | 270 mµ, | a=43.61. | a characteristic IR absorption at the following frequencies expressed in reciprocal centimeters:

| | |
|---|---|
| 3400 (S) | 1280 (M) |
| 3310 (S) | 1260 (S) |
| 3240 (S) | 1245 (S) |
| 3220 (S) | 1200 (M) |
| 3140 (S) | 1164 (M) |
| 2950 (S) (oil) | 1137 (S) |
| 2920 (S) (oil) | 1125 (M) |
| 2850 (S) (oil) | 1092 (S) |
| 2620 (M) | 1084 (M) |
| 1910 (W) | 1057 (M) |
| 1650 (S) | 1045 (S) |
| 1645 (S) | 1020 (S) |
| 1600 (S) | 995 (S) |
| 1526 (S) | 955 (M) |
| 1510 (M) | 912 (M) |
| 1480 (S) | 905 (M) |
| 1462 (S) (oil) | 870 (S) |
| 1425 (S) | 852 (W) |
| 1370 (M) (oil) | 843 (W) |
| 1355 (S) | 800 (M) |
| 1342 (M) | 715 (S) |
| 1310 (S) | 702 (S) |
| 1285 (M) | | and as shown in FIGURE 3 of the accompanying drawing, a characteristic papergram pattern as shown in FIGURE 4, and the following elemental analysis:

*Analysis.*—Calcd. for $C_{11}H_{14}N_4O_4$: C, 49.62; H, 5.30; N, 21.04. Found: C, 49.62; H, 5.04; N, 20.81.

The characteristics of sparsomycin A, described above, are in good agreement with those reported in the literature for tubercidin. See Anzai, K.; G. Nakamura and S. Suzuki: A new antibiotic, tubercidin. J. Antibiotics, Ser. A, pp. 201–204, September 1957. However, no process whereby tubercidin can be produced is disclosed.

EXAMPLE 1

2′,3′-O-isopropylidenesparsomycin A {7 - (2,3 - O - isopropylidene - β - D - ribofuranosyl)-7H-pyrrolo[2,3-d]-pyrimidine}

A mixture of 1 g. of sparsomycin A which had been dried overnight at 108° C. under a reduced pressure of 0.3 mm., 7.5 g. of p-toluenesulfonic acid monohydrate and 50 ml. of acetone which previously had been distilled from potassium permanganate and potassium carbonate in that order, was stirred at room temperature for a period of 2 hours. The reaction mixture was then cooled to 3° C. and a solution of 200 ml. of 0.5 N sodium bicarbonate at 3° C. was added. The resulting solution was evaporated to dryness at 35° C. under reduced pressure. The residue thus obtained was extracted first with two 100-ml. portions of boiling chloroform and then with two 100-ml. portions of chloroform at room temperature. These extracts were filtered individually, then combined and evaporated. The thus-obtained residue was dissolved in 25 ml. of boiling water and the resulting solution was filtered. Refrigeration of the filtrate gave a crystalline precipitate of 2′,3′-O-isopropylidene, sparsomycin A weighing 0.75 g. (65%) and having a melting point of 170–173° C.

After two additional recrystallizations from water 2′,3′-O-isopropylidenesparsomycin A of melting point 174–177° C. was obtained having the following analysis:

*Analysis.*—Calcd. for $C_{14}H_{18}N_4O_4$: C, 54.89; H, 5.92; N, 18.29; O, 20.92; CH₃C, 4.92. Found: C, 54.72; H, 5.92; N, 18.51; O, 21.2; CH₃C, 4.3.

EXAMPLE 2

2′,3′-O-(2-butylidene) acetal of sparsomycin A

In the manner given in Example 1, methyl ethyl ketone, sparsomycin A and p-toluenesulfonic acid monohydrate were reacted at room temperature for a period of 3 hours to give 2′,3′-O-(2-butylidene) acetal of sparsomycin A.

EXAMPLE 3

2',3'-O-cyclohexylidene acetal of sparsomycin A

In the manner given in Example 1, sparsomycin A, dissolved in cyclohexanone, was reacted at a temperature of 40–50° C. in the presence of p-toluenesulfonic acid monohydrate for a period of 3 hours. Excess of p-toluenesulfonic acid was neutralized with dilute sodium bicarbonate and the mixture thereupon extracted with carbon tetrachloride, the carbon tetrachloride extracts evaporated and the thus-obtained residue recrystallized from boiling water to give 2',3'-O-cyclohexylidene acetal of sparsomycin A.

EXAMPLE 4

2',3'-O-ethylidenesparsomycin A

In the manner shown in Example 1, sparsomycin A dissolved in acetaldehyde was reacted in the presence of benzenesulfonic acid to give the corresponding 2',3'-O-ethylidenesparsomycin A.

In the manner given in Example 1, other 2',3'-O-acetals of sparsomycin A can be produced by reacting selected aldehydes or ketones in the presence of an acid catalyst, such as toluenesulfonic acid, benzenesulfonic acid, with sparsomycin A. Representative acetals thus obtained include the 2',3'-O-propylidene, -butylidene, -cyclopentylidene, -cycloheptylidene, -dimethylmethylene, -dipropylmethylene, -dibutylmethylene, -ethylpropylmethylene, -ethylbutylmethylene, -di-isopropylmethylene, and the like acetals of sparsomycin A.

EXAMPLE 5

2',3'-O-isopropylidenesparsomycin A 5' - dihydrogenphosphate {7-(2',3'-O-ispropylidene-β-D-ribofuranosyl) - 7-H-pyrrolo[2,3-d]-pyrimidine 5'-dihydrogenphosphate}

A mixture of 2.78 g. (9.1 mmoles) of 2',3'-O-isopropylidene sparsomycin A, 20 ml. of β-cyanoethyl dihydrogenphosphate reagent [50 mmoles prepared according to G. M. Tener, J. Am. Chem. Soc., 83, 159 (1959)] and 120 ml. of dry pyridine was evaporated to dryness under reduced pressure at about 40° C. The thus-obtained residue was dissolved in 120 ml. of dry pyridine and the solution was again evaporated to dryness in the same way. This procedure was repeated twice. The residue was then dissolved in 120 ml. of dry pyridine, and 24 g. (0.12 mole) of N,N'-dicyclohexylcarbodiimide was added. The solution was allowed to stand at room temperature for a period of 18 hours. Twelve milliliters of water was added, and the mixture was filtered after it had stood for 45 minutes. The filtrate was extracted with two 100-ml. portions of Skellysolve B hexanes. The aqueous layer was evaporated to dryness under reduced pressure. The residue was mixed with 480 ml. of 0.4 molar lithium hydroxide solution, and the mixture was boiled for one hour. The cooled reaction mixture was filtered and the filtrate was extracted with two 100-ml. portions of ether. The aqueous solution was passed over 200 ml. of a cation exchange resin (IRC–50) and the resin was washed with 400 ml. of water. The combined effluent and washings (835 ml.) had a pH of 4.7. The pH was thereupon adjusted to 2.5 with the addition of 1 N aqueous sulfuric acid and the acidic solution was boiled for 1½ hours. The solution was then concentrated to 280 ml. under reduced pressure and adjusted to a pH of 7.5 with saturated barium hydroxide solution. The precipitate of barium sulfate was removed by centrifugation and the supernatant liquid was diluted with 1280 ml. (2 vols.) of ethyl alcohol. Refrigeration gave a precipitate which was removed by filtration and the filter cake was washed with alcohol and ether. The filter cake was thereupon dried weighing 1.62 g. and consisting mainly of the barium salt of sparsomycin A 5'-phosphate. Also, lithium and sodium salts are present.

Two grams of such material was heated in 50 ml. of water and the mixture was filtered. The filtrate was applied to 100 ml. of Dowex 1X8 (formate cycle). The column was developed with 500 ml. portions of 0.01 N, 0.02 N, 0.04 N, and 0.08 N formic acid collecting 10-ml. portions. Fractions 31–60 were combined and evaporated to dryness under reduced pressure. The residue was triturated with 10 ml. of water, and the mixture was refrigerated. The crystals were collected by filtration, weight 236 mg., melting point 255–265° C. with decomposition.

Analysis.—Calcd. for $C_{11}H_{15}N_4O_7P$: C, 38.16; H, 4.37; N, 16.18; P, 8.95. Found: C, 38.25; H, 4.57; N, 16.17; P, 9.06.

EXAMPLE 6

Sparsomycin A 5'-dihydrogenphosphate from 2',3'-O-(2-butylidene) sparsomycin A In the same manner given in Example 5, 2',3'-O-(2-butylidene) sparsomycin A was reacted with cyanoethyl phosphate in pyridine solution in the presence of N,N'-dicyclohexylcarbodiimide to give the corresponding 2',3'-O-(2-butylidene) sparsomycin A 5'-cyanoethyl phosphate. The thus-obtained cyanoethyl phosphate was cleaved with 0.5 molar sodium hydroxide solution by boiling for a period of 45 minutes. The reaction mixture was then cooled, filtered and the filtrate extracted with ether and the ether fraction treated as in Example 5. After boiling the products of the ether fraction with aqueous sulfuric acid, sparsomycin A 5'-dihydrogenphosphate was obtained which was isolated and purified as described in Example 5.

In the manner given in Example 5 other 2',3'-O-acetals of sparsomycin A can be converted to phosphates by the use of β-(negatively substituted)ethyl dihydrogenphosphate in the presence of a dehydrating agent such as carbodiimides, for example, dicyclohexylcarbodiimide, and cleaving the thus-obtained ethyl dihydrogenphosphate with a base such as an alkali hydroxide to obtain the acetal of sparsomycin A 5'-dihydrogenphosphate and removing by acid hydrolysis the acetal moiety to obtain sparsomycin A 5'-dihydrogenphosphate. Representative starting materials for this reaction sequence are: 2',3'-O-(2-hexylidene)sparsomycin A; 2',3'-O-diethylmethylenesparsomycin A; 2',3'-O-ethylidenesparsomycin A; 2',3'-O-di-isopropylmethylenesparsomycin A; 2',3'-O-propylidenesparsomycin A; 2',3'-O-cyclopentylidenesparsomycin A; 2',3'-O-cyclohexylidenesparsomycin A; 2',3'-O-cycloheptylidenesparsomycin A and the like.

I claim:

1. A sparsomycin A 2',3'-O-acetal of the formula:

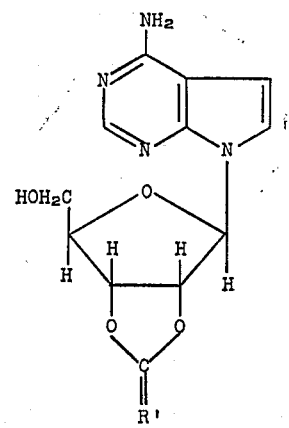

wherein R' is selected from the group consisting of alkylene of formula $-(CH_2)_n-$ in which $n$ has a value of 4 to 6, inclusive, and $R_1$ and $R_2$ in which $R_1$ and $R_2$ are selected from the group consisting of lower alkyl and hydrogen.

2. 2′,3′-O-isopropylidenesparsomycin A having the formula:

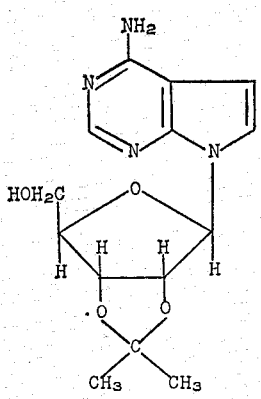

3. Sparsomycin A 5′-dihydrogenphosphate of the formula:

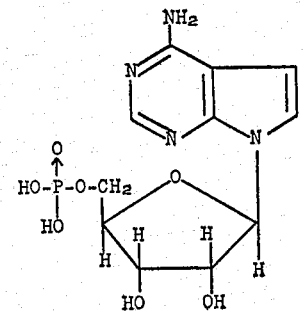

References Cited

Khorana: "Some Recent Developments in the Chemistry of Phosphate Esters of Biological Interest," 1961, John Wiley and Sons, Inc., New York, N.Y., pp. 24–28, 36 and 37.

Suzuki et al.: "Jour. Antibiotics," Ser. A vol. 13, 1960, p. 360.

LEWIS GOTTS, *Primary Examiner.*

JOHNNIE R. BROWN, *Assistant Examiner.*